Oct. 31, 1950  R. A. McCONNELL  2,527,753
RADIO OBJECT LOCATING SYSTEM
Filed July 9, 1945
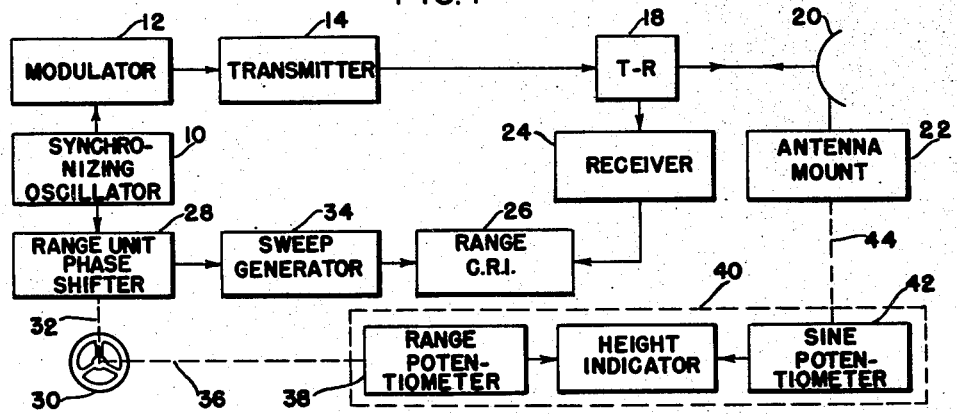
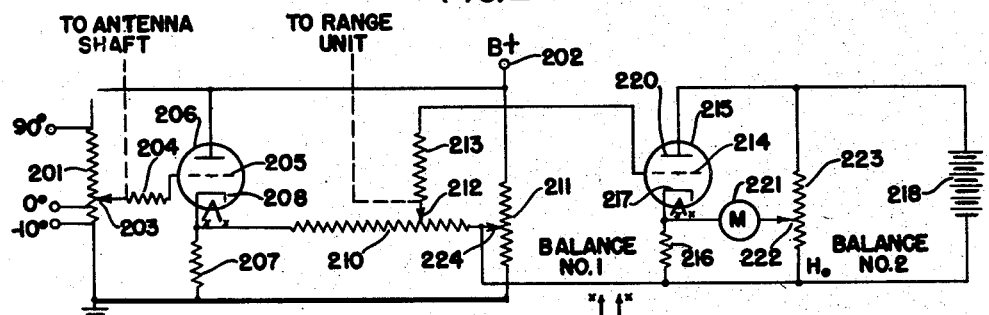
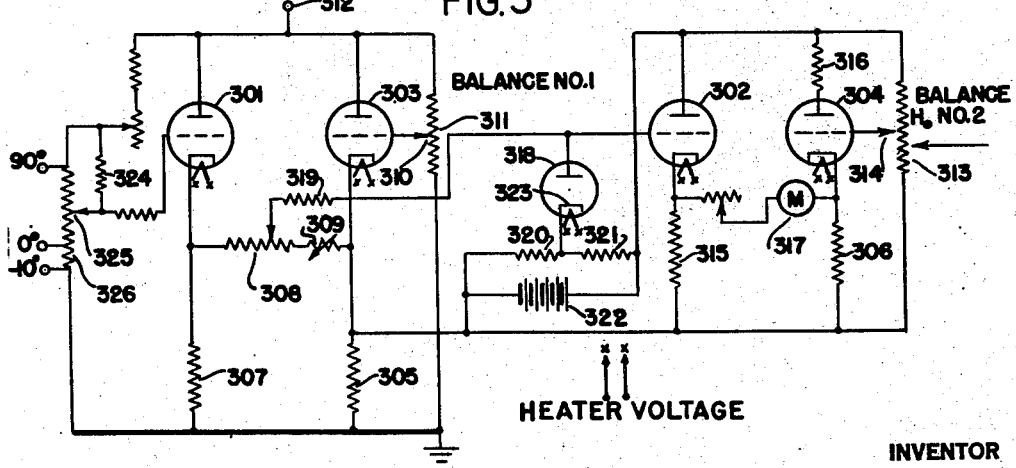
INVENTOR
ROBERT A. McCONNELL
BY William D. Hall
ATTORNEY Patented Oct. 31, 1950

2,527,753

UNITED STATES PATENT OFFICE 2,527,753

RADIO OBJECT LOCATING SYSTEM

Robert A. McConnell, Cambridge, Mass., assignor, by mesne assignments, to the United States of America as represented by the Secretary of War Application July 9, 1945, Serial No. 604,051

5 Claims. (Cl. 343—12)

The present invention relates to radio pulse echo object locating systems, and it relates more particularly to an apparatus and method, for automatic height determination of a single object which has been selected by an operator of the system.

In radio object locating systems, in general, exploratory pulses of radio frequency energy are radiated by a directional antenna. If the exploratory pulses of radiant energy strike an object capable of reradiating this energy, they will be reflected, in part, back to their source by this object. The echo pulses upon their return to their source have sufficient energy to produce an observable effect in a suitable receiver located in the vicinity of the original source of radiant energy. Generally the effect is manifested by a visual indication on a cathode ray oscilloscope. The location of the object is given, as a rule, in terms of its slant range "R" and its azimuthal angle.

Under certain operating conditions it becomes desirable to know the height of the object, with reference to the horizontal plane through the antenna or some other reference plane such as sea level. Thus in addition to the usual range and azimuth information given by the radio object locating system, it is also desirable to provide a height indicating unit or altimeter as it may hereinafter be called.

The height of the object above the observer, neglecting correction for the curvature of the earth, is given by $$H = R \sin \theta \qquad (1)$$

where,

H is the sought height in feet
R is the slant range in feet
$\theta$ is the angle of elevation of the lobe axis of the antenna beam.

More generally, $$H = R \sin \theta + H_0 \qquad (2)$$

where, $H_0$ is the height of the radio object location station, above the reference plane.

The height of the object may be determined by electrical means if the slant range of the object and its angle of elevation can be obtained as electrical data. This may be readily accomplished by obtaining a voltage proportional to the slant range, and a second voltage proportional to the sine of the angle of elevation. By electrically multiplying the two voltages so as to obtain a resultant voltage proportional to the product of the two data voltages, a voltage proportional to the height of the object may be obtained. Corrections for the height of the radio object locating system above the reference plane may be made by adding, to the above product, a voltage proportional to said height.

It is therefore an object of the present invention to provide an automatic altimeter for a radio object locating system which has means for directly determining the slant range and elevation angle of a selected object.

It is another object of the present invention to provide an automatic altitude indicator for a radio object locating system, the indicator being connected to the antenna in a manner whereby the elevation angle of the object is transformed into a voltage proportional to sine $\theta$, and which is also adapted to obtain a voltage proportional to the slant range of the selected object.

The invention together with further objects and advantages thereof may best be understood by reference to the following description in connection with the accompanying drawings, in which Fig. 1 is a block diagram of a radio object location system embodying the present invention;

Fig. 2 is a schematic diagram of one embodiment of the present invention; and

Fig. 3 is a schematic diagram of a second embodiment of the present invention.

One means for obtaining a voltage proportional to slant range, and a second voltage proportional to sine $\theta$ can be more fully understood by reference to Fig. 1. In the figure a synchronizing oscillator 10 is used for periodically actuating modulator 12 which in turn actuates a transmitter 14, the output of the latter consisting of, short duration, high carrier frequency, exploratory pulses of radiant energy. The exploratory pulses are then fed through transmit receive switch 18 to directional antenna 20, the latter being supported by antenna mount 22. The transmit receive switch 18 is also connected to a receiver 24, the output of which is applied to cathode ray indicator 26 (range).

A second output from synchronizing oscillator 10 is applied to a range unit phase shifter 28. The phase of the output from phase shifter 28 may be controlled by hand wheel 30, which is coupled to said phase shifter by shaft 32. The variable phase output from phase shifter 28 is then applied to a suitable sweep circuit generator 34 which provides the time base voltage for a cathode ray indicator 26.

Hand wheel 30 is also connected by shaft 36 to the movable arm of linear range potentiometer 38 which forms a portion of altimeter 40. It is evident that the connections between hand wheel 30, phase shifter 28, and range potentiometer 38, respectively, may consist of a shaft or any other suitable data transmission means.

The hand wheel 30 may be rotated until a desired echo is aligned with a hairline on the screen of cathode ray indicator 26. As shaft 36 is also connected to the movable arm of range potentiometer 38, and as the amount of phase shift is linearly proportional both to the slant range and to the angular rotation of hand wheel 30, a voltage is developed at said movable arm proportional to the slant range of the desired object.

Referring again to Fig. 1, a voltage proportional to the sine of the angle of elevation $\theta$ may be obtained by associating a sine characteristic potentiometer 42 with directional antenna 20. Directional antenna 20 is mechanically connected to the movable arm of the sine characteristic potentiometer. As the antenna is pointed at an object singled out by the operator, angular elevation of the antenna axis may be translated into a corresponding angular position of a rotatable shaft 44, hereinafter termed antenna shaft, by any suitable mechanism (not shown). By changing the angle of elevation of antenna 20, a corresponding change in antenna shaft rotation may be obtained.

Potentiometer 42 is constructed to produce an output voltage which is proportional to the product of the input voltage and the sine of the angle through which its shaft is rotated. Potentiometers of this type are well known in the radar art and may be found fully described in "Principles of Radar," pages 3–49, by Staff MIT, Radar School, Technology Press, Cambridge, Mass., 1944, and "Electronics Instruments," pages 55, 111, 162, by Greenwand, Holdum and McCraes, Radiation Laboratory Series, vol. 22, McGraw-Hill, NYC 1948.

The sine potentiometer 42 may consist of a wire wound card, in the center of which is a rotatable shaft on which is mounted an arm adapted to contact the windings on the circumference of a circle centered about said shaft. The potentiometer provides a voltage proportional to the sine of the angle of shaft rotation. If desired the sine potentiometer may utilize a linear potentiometer associated with a sine cam. Thus by coupling the aforesaid antenna shaft to the sine potentiometer, a voltage proportional to the sine of the angle of elevation may be obtained.

It is apparent from the geometry of the system that sine potentiometer 42 need have a sine characteristic only to a maximum angle of 90°. Under some conditions, however, it is desirable to observe objects below the level of the radio object locating station, and hence the sine characteristic should be available for angles of elevation of about 10° below the station level to 90° above.

Reference is made to Fig. 2 which shows, in simplified form, a circuit diagram of altimeter 40 (Fig. 1). A potentiometer 201 providing a sine characteristic is connected between a regulated source of positive potential 202 and ground. Movable arm 203 of said potentiometer is connected to the antenna shaft either directly or by means of a cam (as described above). For ease in adjusting the circuit, the 0° and 90° points on the potentiometer should be indicated so that movable arm 203 can readily be set to either of these marks.

Movable arm 203 is connected through grid resistance 204 to control grid 205 of vacuum tube 206. Vacuum tube 206 is incorporated in a cathode follower circuit, a cathode load impedance 207 being connected from cathode 208 to ground. Thus a voltage substantially proportional to the sine of the angle of antenna elevation is developed across said load impedance.

A range potentiometer 210 is connected between cathode 208 and balancing potentiometer 211, the latter being connected between ground and the regulated source of potential 202. Balancing potentiometer 211 is employed in adjusting the altimeter circuit for proper operation, said adjustment being more fully described hereinafter.

Movable arm 212 of range potentiometer 210 is suitably connected to the range unit of the radio object locating system. For example, in a radio object locating system such as the one shown in Fig. 1, movable arm 212 (Fig. 2) is connected by mechanical connection 36 (Fig. 1) to hand wheel 30. Said movable arm 212 is electrically connected through grid resistance 213 to control grid 214 of vacuum tube 215. Vacuum tube 215 is likewise incorporated in a cathode follower circuit, there being a cathode load impedance 216 connected between cathode 217 and movable arm 224 of balancing potentiometer 211. A regulated source of positive potential shown as battery 218, is connected between anode 220 of vacuum tube 215 and said movable arm.

The actual altitude indicator comprises a voltage responsive device such as voltmeter 221 (calibrated to read directly in terms of height) connected between cathode 217 and movable arm 222 of balancing potentiometer 223. Balancing potentiometer 223 is connected across potential source 218 and it, too, is employed in adjusting the circuit for proper operation.

As a voltage proportional to the sine of the angle of elevation is developed across cathode load resistor 207 of vacuum tube 206, a similar voltage is developed across range potentiometer 210. As the position of movable arm 212 of said range potentiometer is controlled by the range unit of the radio object locating system, a voltage proportional to the product of the angle of elevation and the range is developed at movable arm 212. Thus the voltage input to control grid 214 of vacuum tube 215 is proportional to "R sin $\theta$."

The circuit in Fig. 2 may be adjusted as follows: the conductivity of cathode follower 215 is adjusted first by shifting the setting of the potentiometer arm 203 to a point corresponding to 90°, and by shorting the range potentiometer 210 (move arm 212 to the right extremity). Since the range potentiometer is shorted, it corresponds to a range reading equal to zero, and the product of "R sin $\theta$" is then equal to zero. Accordingly, the reading of voltmeter 221 should be zero, and this is obtained by adjusting the setting of potentiometer arm 222 of balancing potentiometer 223 (balance No. 2, H₀) until the potential appearing across cathode resistance 216 is equal to the potential appearing at potentiometer arm 222.

After adjusting balance No. 2, proper state of conductivity of triode 206, and especially the potential appearing across the range potentiometer 210, may be obtained by shifting the position of potentiometer arm 203 to a point corresponding to 0°, setting range potentiometer arm 212 to maximum range (left extremity), and adjusting arm 224 of balancing potentiometer 211 (balance No. 1) to again produce zero reading in meter 221.

If it is necessary to determine the altitude with respect to a reference level which is other than the level of the radio object location station, the setting of potentiometer arm 222 is adjusted until the voltmeter reading corresponds to H₀, (where H₀ is the height of the station above the reference plane). This adjustment is made with movable arm 203 of sine potentiometer 201 set to 90°, and after completing the balancing adjustments.

In the circuit shown in Fig. 2, if the heater voltages of vacuum tubes 206 and 215 should decrease, there would, of course, be a resultant decrease in the emissivity of the respective cathodes. Thus, there would be decreased voltage apearing across cathode load resistances 207 and 216. This would have the effect of changing to a certain extent, the calibration of the altitude indicating voltmeter 221. An improved circuit which overcomes the effect of heater voltage fluctuations is shown in Fig. 3.

The circuit shown in Fig. 3 is generally similar to that shown in Fig. 2. In Fig. 3, vacuum tubes 301 and 302 are similar to vacuum tubes 206 and 215, respectively of Fig. 2. Two additional vacuum tubes 303 and 304 are provided, and the heater elements of these vacuum tubes are connected to the same source of heater potential as those of vacuum tubes 301 and 302. Vacuum tubes 303 and 304 have cathode load resistances 305 and 306, respectively. Therefore, any fluctuation in heater potential produces identical effects in the circuits of these vacuum tubes, and any voltage change across cathode resistance 307 (vacuum tube 301) will be followed by an equal change across cathode resistance 305. Accordingly (if the two load impedances are equal), the potential impressed across range potentiometer 308 and zero range correction potentiometer 309 (the two being connected between the cathodes of tube 301 and 303) is unaffected by such a change. Zero range correction potentiometer 309 in series with range potentiometer 308 is provided in order to make the potentiometer zero correspond to the true zero range. The current flow through vacuum tube 303 may be controlled by adjusting movable arm 310 of potentiometer 311. This potentiometer is connected between regulated positive potential source 312 and ground, and is used in exactly the same manner as balance No. 1 in Fig. 2 (potentiometer arm 224).

Vacuum tube 304 acts in the same manner as vacuum tube 303. Associated with said vacuum tube is a potentiometer 313 having movable arm 314. This potentiometer is used in the same manner as balance No. 2 in Fig. 2 (potentiometer arm 222). The characteristics of the circuit employing vacuum tube 304 should differ from the characteristics of the cathode follower circuit employing vacuum tube 302 and this is readily accomplished by making the value of cathode resistance 306 different from that of cathode load resistance 315 (vacuum tube 302). The current through vacuum tube 304 may be limited by providing an anode load impedance 316 in the anode circuit thereof. Under these conditions the voltage across cathode load resistance 306 is equal to the voltage across cathode load resistance 315 when the position of movable arm 314 is at some predetermined point between the extremities of balancing potentiometer 313. Thus a potential greater or less than the normal balancing potential may be obtained when necessary, thereby making balance No. 2 variable in both directions.

To prevent possible damage to the height indicating voltmeter 317, a diode 318 is connected across the input circuit of vacuum tube 302. No current is drawn by this diode until the current flowing through voltmeter 317 reaches a predetermined overload value. From then on, diode 318 becomes conductive, thus preventing further rise in the output voltage of vacuum tube 302 by imposing a resistance load upon the range potentiometer 308. A resistance 319 is connected between the movable arm of range potentiometer 308 and the control grid of vacuum tube 302. This resistance provides a high impedance source which can be effectively shorted by diode 318 without regard to the position of the movable arm of range potentiometer 308. Proper operation of diode 318 is obtained by the proper choice of values of resistances 320 and 321. Said resistances constitute a voltage divider network connected across the diode bias supply 322. Cathode 323 of vacuum tube 318 is then connected to the junction point between resistances 320 and 321.

The accuracy of the altimeter circuit may be further improved by the provision of resistance 324 connected from movable arm 325 of sine potentiometer 326 to the point on said potentiometer corresponding to 90°. This resistance introduces a variable corrective potential to the grid of vacuum tube 301 which tends to make the mutual characteristic curve of said tube, more linear.

While the invention has been described with reference to particular embodiments, it will be understood that various modifications of the apparatus shown may be made within the scope of the following claims.

I claim:

1. In combination with a radio object locating system including a directional antenna rotatably mounted and adapted to be pointed at a predetermined object, said object being on a line forming an angle of elevation with respect to horizontal at a point of reference, an altimeter including a first potentiometer providing a sine having a movable arm, a source of voltage across said potentiometer means for connecting said movable arm to said antenna to select a first voltage at said sine potentiometer arm proportional to sine of said angle of elevation, a first cathode follower circuit including a first vacuum tube containing at least a cathode, an anode and a control grid, said control grid being connected to said potentiometer arm, a cathode load impedance, a range channel including a manually adjustable range unit adapted to provide mechanical motion due to said adjustment proportional to the range of said object for determining slant range R to said predetermined object, a range potentiometer having a potentiometer arm mechanically connected to said range unit to produce a second voltage proportional to the range of said predetermined object, a connection between one end of said range potentiometer and the cathode of said first vacuum tube, a second cathode follower circuit including a second vacuum tube having at least a cathode, an anode and a control grid, a direct connection between the cathode of said second vacuum tube and the other end of said range potentiometer, a common source of heater potential connected to the heaters of said first vacuum tube and said second vacuum tube whereby the potential appearing across said range potentiometer is independent of the fluctuation of said heater potential, the potential developed at the movable arm of said range potentiometer being proportional to the height of the predetermined object.

2. In combination with a radio object locating system, an altimeter circuit as defined in claim 1 which further includes a resistance connected between the control grid of said first vacuum tube and the point on said first potentiometer corresponding to an angle of elevation of 90° with reference to horizontal, the value of said resistance being selected so as to make the voltage appearing across said cathode load impedance of said first vacuum tube a substantially linear function of said first voltage, a third cathode follower circuit including a third vacuum tube having at least a cathode, an anode and a control grid, said control grid of said third vacuum tube being connected to said arm of said range potentiometer, a cathode load impedance for said third vacuum tube, a fourth cathode follower circuit including a vacuum tube having at least a cathode, an anode and a control grid, a cathode load impedance for said fourth vacuum tube, a variable potential source, said control grid of said fourth vacuum tube being connected thereto, a voltage responsive altitude indicating device connected between the cathodes of said third and fourth vacuum tubes.

3. In a radio object locating system having a directional antenna and a manually adjustable range unit adapted to provide mechanical motion due to said adjustment proportional to the range of a predetermined object, an altimeter circuit including a sine potentiometer having a movable arm, a source of voltage across said potentiometer, whereby a voltage may be selected at said movable arm which will be proportional to the sine of the angle of movement of said arm, a vacuum tube containing at least a cathode, an anode and a control grid, said control grid being connected to said potentiometer arm, a cathode-anode circuit including a load impedance, a range potentiometer having a movable arm, one side of said range potentiometer being connected to one side of said load impedance, a second vacuum tube containing at least a cathode, an anode and a control grid and having a cathode-anode circuit including load impedance, the other side of said range potentiometer being connected to one side of said last mentioned load impedance, means for predetermining the current flow through said second vacuum tube, a common source of heater potential for said first vacuum tube and for said second vacuum tube, a third vacuum tube containing at least a cathode, an anode and a control grid, said control grid of said third vacuum tube, being electrically connected to the movable arm of said range potentiometer and the cathode-anode circuit including a load impedance, a fourth vacuum tube containing at least a cathode, an anode and a control grid and having a cathode-anode circuit including a load impedance, means for predetermining the current flow through said fourth vacuum tube, a common source of heater potential for said third and fourth vacuum tubes, a voltage responsive indicator connected between the load impedances of said third and fourth vacuum tubes to provide an indication of the altitude of said predetermined object above any desired reference plane.

4. In combination with a radio object locating system, an altimeter circuit as defined in claim 3 which further includes a vacuum tube having at least an anode and cathode, said anode being connected to said control grid of said third vacuum tube, a source of cathode biasing potential for said vacuum tube, said cathode being connected thereto, whereby said vacuum tube limits the voltage applied to said voltage responsive indicator to a predetermined value.

5. In a radio object locating system having a directional antenna and a manually adjustable range unit adapted to provide a mechanical motion due to said adjustment proportional to the range of a predetermined object, an altimeter circuit including a sine potentiometer having a movable arm, a source of potential across said potentiometer, whereby a voltage proportional to the angle of movement of said arm may be selected by said arm, a vacuum tube containing at least a cathode, an anode and control grid, said potentiometer arm being connected to said control grid, a cathode-anode circuit including a load impedance, a range potentiometer having a movable arm, one side of said range potentiometer being connected to one side of said load impedance, and the other side being connected to a source of potential, means for mechanically connecting said range potentiometer arm to said range unit, a second vacuum tube containing at least a cathode, an anode and control grid, said control grid of said second vacuum tube being electrically connected to the movable arm of said range potentiometer, a cathode-anode circuit including a load impedance for said second vacuum tube, a voltage responsive device connected to one side of said load impedance of said second vacuum tube, said voltage responsive device being calibrated to provide an indication of the altitude of said predetermined object about any desired reference plane.

ROBERT A. McCONNELL.

REFERENCES CITED

The following references are of record in the file of this patent:

UNITED STATES PATENTS

| Number | Name | Date |
|---|---|---|
| 2,070,178 | Pottenger et al. | Feb. 9, 1937 |
| 2,407,325 | Parkinson | Sept. 10, 1946 |
| 2,418,364 | Moe | Apr. 1, 1947 |
| 2,426,189 | Espenschied | Aug. 26, 1947 |
| 2,430,292 | Hershberger | Nov. 4, 1947 |

OTHER REFERENCES

Electronics, "The SCR-268 Radar," September 1945, pp. 100, 101.